US012808382B2

(12) United States Patent
Shinde et al.

(10) Patent No.: US 12,808,382 B2
(45) Date of Patent: Nov. 24, 2026

(54) GAS TURBINE ENGINE HAVING A SENSOR ASSEMBLY FOR MONITORING PROPELLER WHIRL

(71) Applicant: General Electric Company, Schenectady, NY (US)

(72) Inventors: Kudum Shinde, Bengaluru (IN); Surender Reddy Bhavanam, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 244 days.

(21) Appl. No.: 18/517,240

(22) Filed: Nov. 22, 2023

(65) Prior Publication Data

US 2025/0043795 A1 Feb. 6, 2025

(30) Foreign Application Priority Data

Jul. 31, 2023 (IN) ............................ 202311051297

(51) Int. Cl.
*F04D 27/00* (2006.01)
*B64D 27/12* (2006.01)
(Continued)

(52) U.S. Cl.
CPC ............ *F04D 27/001* (2013.01); *F01D 7/00* (2013.01); *F01D 17/04* (2013.01); *F01D 21/003* (2013.01); *F01D 21/04* (2013.01); *F01D 21/045* (2013.01); *F01D 21/14* (2013.01); *F02C 7/057* (2013.01); *F02C 7/20* (2013.01); *F02C 9/20* (2013.01);
(Continued)

(58) Field of Classification Search
CPC . F01D 7/00; F01D 17/04; F01D 21/00; F01D 21/003; F01D 21/04; F01D 21/045; F01D 21/14; F01D 25/28; F02C 7/20; F02C 7/057; F02C 9/20; F05D 2260/74; F05D 2240/90; F05D 2240/91; F05D 2270/331; F05D 2270/332; F05D 2270/808; B64D 27/12; B64D 27/40; B64D 27/404; B64D 27/406
See application file for complete search history.

(56) References Cited

U.S. PATENT DOCUMENTS 3,400,584 A 9/1968 Beilman
4,072,049 A 2/1978 Miller
(Continued)

FOREIGN PATENT DOCUMENTS

FR 3102976 A1 * 5/2021

OTHER PUBLICATIONS

English machine translation of FR-3102976-A1, Feb. 2, 2025.*

*Primary Examiner* — Christopher Verdier
(74) *Attorney, Agent, or Firm* — Venable LLP; Michele V. Frank

(57) ABSTRACT

A gas turbine engine including a frame, a plurality of fan blades configured to rotate about a longitudinal centerline axis of the gas turbine engine, and a mounting assembly coupling the frame to a structure. The gas turbine engine includes a sensor assembly coupled to the mounting assembly and having at least one sensor configured to detect a loading on the mounting assembly and to take a corrective action when propeller whirl is detected above a predetermined limit, and a feature configured to take a corrective action when propeller whirl is detected above a predetermined limit.

20 Claims, 8 Drawing Sheets

(51) Int. Cl.

| | |
|---|---|
| ***B64D 27/40*** | (2024.01) |
| ***F01D 7/00*** | (2006.01) |
| ***F01D 17/04*** | (2006.01) |
| ***F01D 21/00*** | (2006.01) |
| ***F01D 21/04*** | (2006.01) |
| ***F01D 21/14*** | (2006.01) |
| ***F01D 25/28*** | (2006.01) |
| ***F02C 7/057*** | (2006.01) |
| ***F02C 7/20*** | (2006.01) |
| ***F02C 9/20*** | (2006.01) |

(52) U.S. Cl.
CPC ............ *F04D 27/002* (2013.01); *B64D 27/12* (2013.01); *B64D 27/404* (2024.01); *B64D 27/406* (2024.01); *F01D 25/28* (2013.01); *F05D 2220/36* (2013.01); *F05D 2240/91* (2013.01); *F05D 2260/70* (2013.01); *F05D 2260/74* (2013.01); *F05D 2270/331* (2013.01); *F05D 2270/332* (2013.01); *F05D 2270/808* (2013.01)

(56) References Cited

U.S. PATENT DOCUMENTS

| | | | | |
|---|---|---|---|---|
| 4,089,216 | A | 5/1978 | Elias | |
| 5,099,430 | A | 3/1992 | Hirsch | |
| 5,239,864 | A | 8/1993 | von Pragenau | |
| 5,524,847 | A * | 6/1996 | Brodell | B64C 7/02 60/797 |
| 6,843,449 | B1 * | 1/2005 | Manteiga | B64D 27/40 244/54 |
| 7,640,802 | B2 | 1/2010 | King et al. | |
| 8,041,520 | B2 | 10/2011 | Mesec | |
| 9,216,821 | B1 | 12/2015 | Holemans et al. | |
| 10,359,473 | B2 | 7/2019 | Qiao et al. | |
| 2018/0339770 | A1 | 11/2018 | Brunken et al. | |
| 2020/0003261 | A1 * | 1/2020 | Boehme | F16C 43/04 |
| 2020/0080475 | A1 * | 3/2020 | Baladi | F02C 3/04 |
| 2021/0261262 | A1 * | 8/2021 | Schelfaut | B64D 27/40 |
| 2021/0261263 | A1 * | 8/2021 | Schelfaut | F02C 9/48 |
| 2022/0055757 | A1 * | 2/2022 | Shinde | B64D 27/40 |
| 2024/0051656 | A1 * | 2/2024 | Zutshi | B64C 11/32 |
| 2024/0052753 | A1 * | 2/2024 | Zutshi | B64D 27/10 |
| 2024/0052755 | A1 * | 2/2024 | Cafaro | F01D 17/162 |

* cited by examiner

GAS TURBINE ENGINE HAVING A SENSOR ASSEMBLY FOR MONITORING PROPELLER WHIRL

CROSS REFERENCE TO RELATED APPLICATIONS

The present application claims the benefit of Indian Patent Application number 202311051297, filed on Jul. 31, 2023, which is hereby incorporated by reference herein in its entirety.

TECHNICAL FIELD

The present disclosure relates generally to a gas turbine engine including a sensor assembly for monitoring propeller whirl.

BACKGROUND

A turbine engine generally includes a fan and a core section arranged in flow communication with one another. The fan includes a plurality of fan blades that rotate about a longitudinal centerline axis of the engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
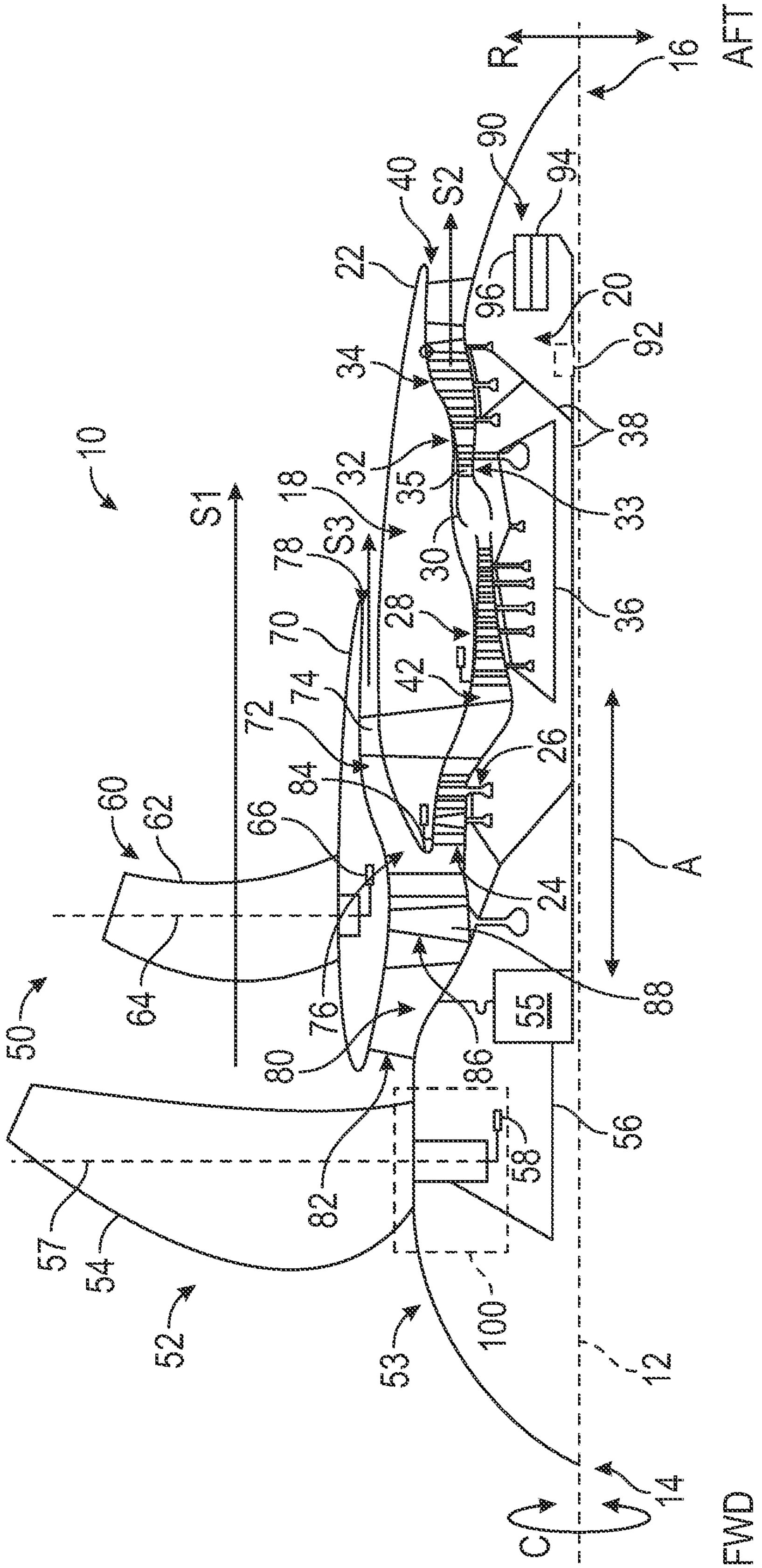
FIG. 1 illustrates a schematic view of an unducted, three-stream gas turbine engine, taken along a longitudinal centerline axis of the engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure describes a system for and a method of detecting whirl in fan blades of an engine, such as the gas turbine engine described with respect to FIG. 1. As used herein, fan blades refer to airfoils extending radially from a central disk in a fan section or a propeller section of the turbine engine. The fan blades are any rotational airfoils for generating thrust in both ducted and unducted engines. Thus, the term fan blades includes, not only fan blades, but also propellers and propeller blades. The whirl is also referred to herein as prop whirl, propeller whirl, whirl mode, prop whirl mode, and propeller whirl mode. During operation of an engine, as will be described in more detail to follow, fan blades may experience propeller whirl that may cause the fan blades to rotate off-center from the central axis of the engine, changing the angle of attack of the fan blade, or both. Such alternation of the operation of the fan blades affects the performance of the engine. The present disclosure provides a sensor assembly that measures the load on mount links coupling the engine to an aircraft. The present disclosure provides a sensor assembly the measures the load on bearing assemblies associated with the low-pressure shaft.

That is, the present disclosure provides strain gauges to calculate individual mount loads. The mount loads along with the mount geometry can be used to calculate engine operation loads. Engine operation loads can be further split into normal or nominal engine operation, maneuver loads (e.g., aerodynamic loads), and dynamic loads capturing 1P loads (e.g., loads at the base RPM of the fan blades). The relation between mount loads and maneuver loads can be obtained through a set of linear equations and/or a transfer function can be developed using development engine testing.

FIG. 1 shows a schematic view of an unducted, three-stream, gas turbine engine 10 for an aircraft that may incorporate one or more embodiments of the present disclosure. The gas turbine engine 10 is a "three-stream engine" in that its architecture provides three distinct streams (labeled S1, S2, and S3) of thrust-producing airflow during operation, as detailed further below.

As shown in FIG. 1, the gas turbine engine 10 defines an axial direction A, a radial direction R, and a circumferential direction C. Moreover, the gas turbine engine 10 defines a longitudinal centerline axis 12 that extends along the axial direction A. In general, the axial direction A extends parallel to the longitudinal centerline axis 12, the radial direction R extends outward from, and inward to, the longitudinal centerline axis 12 in a direction orthogonal to the axial direction A, and the circumferential direction C extends three hundred sixty degrees) (360° around the longitudinal centerline axis 12. The gas turbine engine 10 extends between a forward end 14 and an aft end 16, e.g., along the axial direction A.

The gas turbine engine 10 includes a core engine 20 and a fan assembly 50 positioned upstream thereof. Generally, the core engine 20 includes, in serial flow order, a compressor section, a combustion section, a turbine section, and an exhaust section. Particularly, as shown in FIG. 1, the core engine 20 includes an engine core 18 and a core cowl 22 that annularly surrounds the core engine 20. The engine core 18 includes a high-pressure (HP) compressor 28, a combustor 30, and a high-pressure (HP) turbine 32. The core engine 20 and the core cowl 22 define a core inlet 24 having an annular shape. The core cowl 22 further encloses and supports a low-pressure (LP) compressor 26 (also referred to as a booster) for pressurizing the air that enters the core engine 20 through core inlet 24. The HP compressor 28 receives pressurized air from the LP compressor 26 and further increases the pressure of the air. The pressurized air flows downstream to the combustor 30 where fuel is injected into the pressurized air and ignited to raise the temperature and the energy level of the pressurized air, thereby generating combustion gases.

The combustion gases flow from the combustor 30 downstream to the HP turbine 32. The HP turbine 32 drives the HP compressor 28 through a first shaft, also referred to as a high-pressure (HP) shaft 36 (also referred to as a high-speed shaft). In this regard, the HP turbine 32 is drivingly coupled with the HP compressor 28. The combustion gases then flow to a power turbine or a low-pressure (LP) turbine 34. The LP turbine 34 drives the LP compressor 26 and components of the fan assembly 50 through a second shaft, also referred to as a low-pressure (LP) shaft 38 (also referred to as a low-speed shaft). In this regard, the LP turbine 34 is drivingly coupled with the LP compressor 26 and components of the fan assembly 50. The low-speed shaft 38 is coaxial with the high-speed shaft 36 in the embodiment of FIG. 1. After driving each of the HP turbine 32 and the LP turbine 34, the combustion gases exit the engine core 18 through a core exhaust nozzle 40. The core engine 20 defines a core flowpath, also referred to as a core duct 42, that extends between the core inlet 24 and the core exhaust nozzle 40. The core duct 42 is an annular duct positioned generally inward of the core cowl 22 along the radial direction R.

The fan assembly 50 includes a primary fan 52. For the embodiment of FIG. 1, the primary fan 52 is an open rotor fan, also referred to as an unducted fan. However, in other embodiments, the primary fan 52 may be ducted, e.g., by a fan casing or a nacelle circumferentially surrounding the primary fan 52. The primary fan 52 includes an array of fan blades 54 (only one shown in FIG. 1). The fan blades 54 are rotatably coupled to a hub 53 for rotation about the longitudinal centerline axis 12 via a fan shaft 56. As shown in FIG. 1, the fan shaft 56 is coupled with the low-speed shaft 38 via a speed reduction gearbox, also referred to as a gearbox assembly 55, e.g., in an indirect-drive configuration. The gearbox assembly 55 is shown schematically in FIG. 1. The gearbox assembly 55 includes a plurality of gears for adjusting the rotational speed of the fan shaft 56 and, thus, the primary fan 52 relative to the low-speed shaft 38 to a more efficient rotational fan speed. The fan gearbox assembly may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. The gearbox may be a single stage or a compound gearbox.

The fan blades 54 can be arranged in equal spacing around the longitudinal centerline axis 12. Each fan blade 54 has a root and a tip, and a span defined therebetween. Each fan blade 54 defines a central blade axis 57. For the embodiment of FIG. 1, each fan blade 54 of the primary fan 52 is rotatable about its respective central blade axis 57, e.g., in unison with one another. One or more actuators 58 are controlled to pitch the fan blades 54 about their respective central blade axis 57. In other embodiments, each fan blade 54 is fixed or is unable to be pitched about the central blade axis 57.

The fan assembly 50 further includes a fan guide vane array 60 that includes fan guide vanes 62 (only one shown in FIG. 1) disposed around the longitudinal centerline axis 12. For the embodiment of FIG. 1, the fan guide vanes 62 are not rotatable about the longitudinal centerline axis 12. Each fan guide vane 62 has a root and a tip, and a span defined therebetween. The fan guide vanes 62 can be unshrouded as shown in FIG. 1 or can be shrouded, e.g., by an annular shroud spaced outward from the tips of the fan guide vanes 62 along the radial direction R. Each fan guide vane 62 defines a central vane axis 64. For the embodiment of FIG. 1, each fan guide vane 62 of the fan guide vane array 60 is rotatable about its respective central vane axis 64, e.g., in unison with one another. One or more actuators 66 are controlled to pitch the fan guide vanes 62 about their respective central vane axis 64. In other embodiments, each fan guide vane 62 is fixed or is unable to be pitched about the central vane axis 64. The fan guide vanes 62 are mounted to a fan cowl 70.

The fan cowl 70 annularly encases at least a portion of the core cowl 22 and is generally positioned outward of the core cowl 22 along the radial direction R. Particularly, a downstream section of the fan cowl 70 extends over a forward portion of the core cowl 22 to define a fan flowpath, also referred to as a fan duct 72. Incoming air enters through the fan duct 72 through a fan duct inlet 76 and exits through a fan exhaust nozzle 78 to produce propulsive thrust. The fan duct 72 is an annular duct positioned generally outward of the core duct 42 along the radial direction R. The fan cowl 70 and the core cowl 22 are connected together and supported by a plurality of struts 74 (only one shown in FIG. 1) that extend substantially radially and are circumferentially spaced about the longitudinal centerline axis 12. The plurality of struts 74 are each aerodynamically contoured to direct air flowing thereby. Other struts in addition to the plurality of struts 74 can be used to connect and to support the fan cowl 70 and/or the core cowl 22.

The gas turbine engine 10 also defines or includes an inlet duct 80. The inlet duct 80 extends between an engine inlet 82 and the core inlet 24 and the fan duct inlet 76. The engine inlet 82 is defined generally at the forward end of the fan cowl 70 and is positioned between the primary fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 42 and the fan duct 72 by a splitter 84 of the core cowl 22. The inlet duct 80 is wider than the core duct 42 along the radial direction R. The inlet duct 80 is also wider than the fan duct 72 along the radial direction R.

The fan assembly 50 also includes a mid-fan 86. The mid-fan 86 includes a plurality of mid-fan blades 88 (only one shown in FIG. 1). The plurality of mid-fan blades 88 are rotatable, e.g., about the longitudinal centerline axis 12. The mid-fan 86 is drivingly coupled with the LP turbine 34 via the low-speed shaft 38. The plurality of mid-fan blades 88 can be arranged in equal circumferential spacing about the longitudinal centerline axis 12. The plurality of mid-fan blades 88 are annularly surrounded (e.g., ducted) by the fan cowl 70. In this regard, the mid-fan 86 is positioned inward of the fan cowl 70 along the radial direction R. The mid-fan 86 is positioned within the inlet duct 80 upstream of both the core duct 42 and the fan duct 72. A ratio of a span of the fan blade 54 to that of a mid-fan blade 88 (a span is measured from a root to tip of the respective blade) is greater than two and less than ten, to achieve the desired benefits of the third stream S3, particularly, the additional thrust the ratio offers to the gas turbine engine 10, which may enable a smaller diameter fan blade 54, which, in turn, can benefit engine installation.

Accordingly, air flowing through the inlet duct 80 flows across the plurality of mid-fan blades 88 and is accelerated downstream thereof. At least a portion of the air accelerated by the mid-fan blades 88 flows into the fan duct 72 and is ultimately exhausted through the fan exhaust nozzle 78 to produce propulsive thrust. Also, at least a portion of the air accelerated by the plurality of mid-fan blades 88 flows into the core duct 42 and is ultimately exhausted through the core exhaust nozzle 40 to produce propulsive thrust. Generally, the mid-fan 86 is a compression device positioned downstream of the engine inlet 82. The mid-fan 86 is operable to accelerate air into the fan duct 72, also referred to as a secondary bypass passage.

During operation of the gas turbine engine 10, an initial or incoming airflow passes through the fan blades 54 of the primary fan 52 and splits into a first airflow and a second airflow. The first airflow bypasses the engine inlet 82 and flows generally along the axial direction A outward of the fan cowl 70 along the radial direction R. The first airflow accelerated by the fan blades 54 passes through the fan guide vanes 62 and continues downstream thereafter to produce a primary propulsion stream or first thrust stream S1. A majority of the net thrust produced by the gas turbine engine 10 is produced by the first thrust stream S1. The second airflow enters the inlet duct 80 through the engine inlet 82.

The second airflow flowing downstream through the inlet duct 80 flows through the plurality of mid-fan blades 88 of the mid-fan 86 and is consequently compressed. The second airflow flowing downstream of the mid-fan blades 88 is split by the splitter 84 located at the forward end of the core cowl 22. Particularly, a portion of the second airflow flowing downstream of the mid-fan 86 flows into the core duct 42 through the core inlet 24. The portion of the second airflow that flows into the core duct 42 is progressively compressed by the LP compressor 26 and the HP compressor 28, and is ultimately discharged into the combustion section. The discharged pressurized air stream flows downstream to the combustor 30 where fuel is introduced to generate combustion gases or products.

The combustor 30 defines an annular combustion chamber that is generally coaxial with the longitudinal centerline axis 12. The combustor 30 receives pressurized air from the HP compressor 28 via a pressure compressor discharge outlet. A portion of the pressurized air flows into a mixer. Fuel is injected by a fuel nozzle (omitted for clarity) to mix with the pressurized air, thereby forming a fuel-air mixture that is provided to the combustion chamber for combustion.

Ignition of the fuel-air mixture is accomplished by one or more igniters (omitted for clarity), and the resulting combustion gases flow along the axial direction A toward, and into, a first stage turbine nozzle 33 of the HP turbine 32. The first stage turbine nozzle 33 is defined by an annular flow channel that includes a plurality of radially extending, circumferentially spaced nozzle vanes 35 that turn the combustion gases so that the combustion gases flow angularly and impinge upon first stage turbine blades of the HP turbine 32. The combustion gases exit the HP turbine 32 and flow through the LP turbine 34, and exit the core duct 42 through the core exhaust nozzle 40 to produce a core air stream, also referred to as a second thrust stream S2. As noted above, the HP turbine 32 drives the HP compressor 28 via the high-speed shaft 36, and the LP turbine 34 drives the LP compressor 26, the primary fan 52, and the mid-fan 86, via the low-speed shaft 38.

The other portion of the second airflow flowing downstream of the mid-fan 86 is split by the splitter 84 into the fan duct 72. The air enters the fan duct 72 through the fan duct inlet 76. The air flows generally along the axial direction A through the fan duct 72 and is ultimately exhausted from the fan duct 72 through the fan exhaust nozzle 78 to produce a third stream, also referred to as the third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and thereby a percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The gas turbine engine 10 depicted in FIG. 1 is by way of example only. In other embodiments, the gas turbine engine 10 may have any other suitable configuration. For example, in other embodiments, the primary fan 52 may be configured in any other suitable manner (e.g., as a fixed pitch fan) and further may be supported using any other suitable fan frame (e.g., fan frame 98 of FIG. 2) configuration. In other embodiments, the primary fan 52 can be ducted by a fan casing or a nacelle such that a bypass passage is defined between the fan casing and the fan cowl 70. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream).

Further, for the depicted embodiment of FIG. 1, the gas turbine engine 10 includes an electric machine 90, which may be a motor-generator, operably coupled with a rotating component thereof. In this regard, the gas turbine engine 10 is a hybrid-electric propulsion machine. Particularly, as shown in FIG. 1, the electric machine 90 is operatively coupled with the low-speed shaft 38. The electric machine 90 can be mechanically connected to the low-speed shaft 38, either directly, or indirectly, e.g., by way of a gearbox assembly 92 (shown schematically in FIG. 1). Further, although, in this embodiment the electric machine 90 is operatively coupled with the low-speed shaft 38 at an aft end of the low-speed shaft 38, the electric machine 90 can be coupled with the low-speed shaft 38 at any suitable location or can be coupled to other rotating components of the gas turbine engine 10, such as the high-speed shaft 36 or the low-speed shaft 38. For instance, in some embodiments, the electric machine 90 can be coupled with the low-speed shaft 38 and positioned forward of the mid-fan 86 along the axial direction.

In some embodiments, the electric machine 90 can be an electric motor operable to drive or to motor the low-speed shaft 38, e.g., during an engine burst. In other embodiments, the electric machine 90 can be an electric generator operable to convert mechanical energy into electrical energy. In this way, electrical power generated by the electric machine 90 can be directed to various engine and/or aircraft systems. In some embodiments, the electric machine 90 can be a motor/generator with dual functionality. The electric machine 90 includes a rotor 94 and a stator 96. The rotor 94 is coupled to the low-speed shaft 38 and rotates with rotation of the low-speed shaft 38. In this way, the rotor 94 rotates with respect to the stator 96, thereby generating electrical power. Although the electric machine 90 has been described and illustrated in FIG. 1 as having a particular configuration, the present disclosure may apply to electric machines having alternative configurations. For instance, the rotor 94 and/or the stator 96 may have different configurations or may be arranged in a different manner than illustrated in FIG. 1.

Figure 4B:
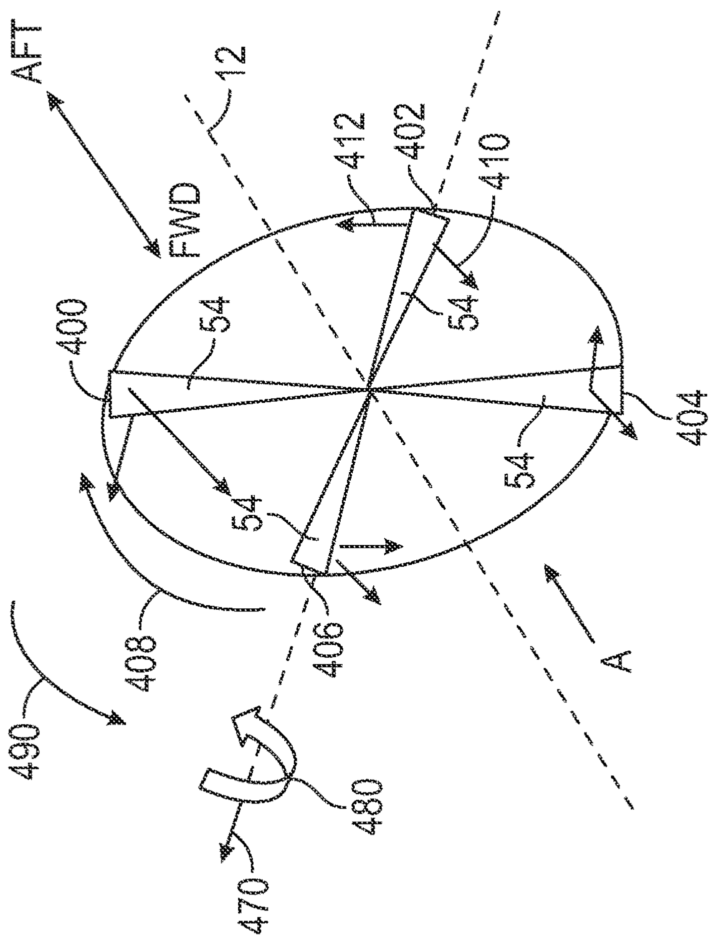
FIG. 4B illustrates a schematic view showing forces of a fan blade, such as the fan blade of the turbine engine shown in FIG. 1, according to the present disclosure.
Figure 4A:
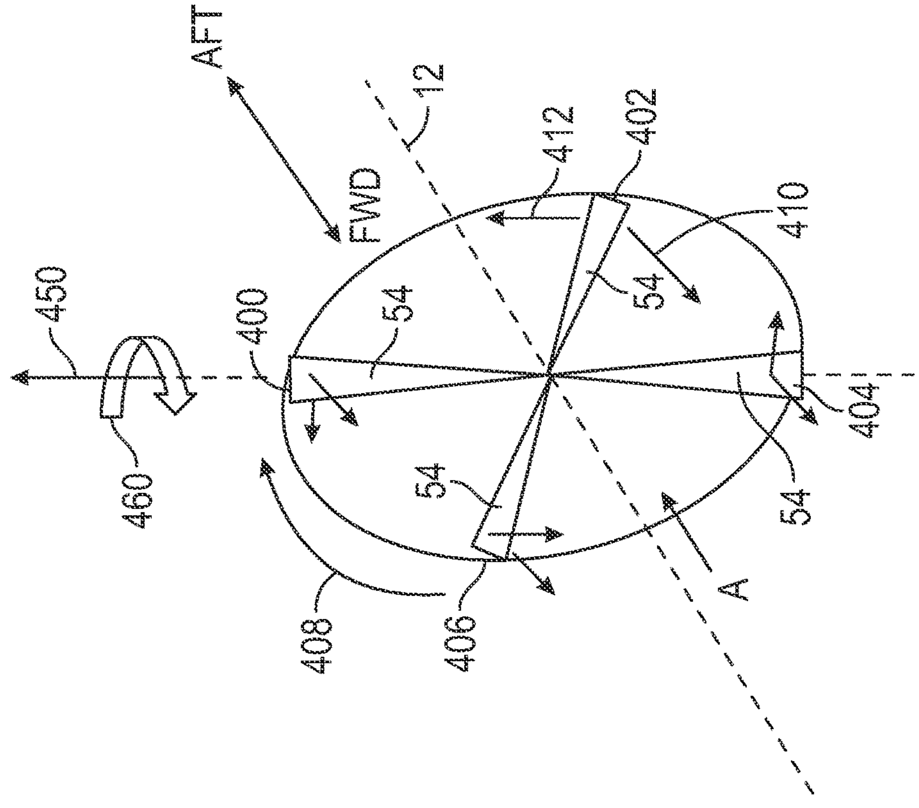
FIG. 4A illustrates a schematic view showing forces of a fan blade, such as the fan blade of the turbine engine shown in FIG. 1, according to the present disclosure.

Referring briefly to FIGS. 4A and 4B, during operation, the fan blades 54 rotate about the longitudinal centerline axis 12 in the clockwise direction 408 while an airflow A flows from a forward end of the engine toward an aft end of the engine (omitted for clarity). FIGS. 4A and 4B illustrate a single representative fan blade 54 to facilitate understanding of propeller whirl mode. The fan blade 54 rotates three-hundred sixty degrees from a twelve o'clock position 400, to a three o'clock position 402, to a six o'clock position 404, to a nine o'clock position 406, and back to the twelve o'clock position 400. The fan blade 54 is a rotating mass about the longitudinal centerline axis 12, with a restrained end at the base of the fan blade 54. Thus, as the fan blade 54 rotates about the longitudinal centerline axis 12, loads exist at the free end of the fan blade 54 (e.g., nearer to the tip of the fan blade 54 as compared to the restrained base of the fan blade 54) in an axial direction 410 and a vertical direction 412.

Accordingly, during operation at the 1P frequency (e.g., the base RPM of the fan blades 54), the rotating fan blade 54 encounters two phenomena, depending on the location of the fan blade 54, as shown in FIGS. 4A and 4B. In FIG. 4A, the fan blade 54 experiences a shear in a vertical direction 450 and a downward moment that causes the fan blade 54 to yaw (e.g., to twist or to oscillate about the vertical direction 450) right in a yaw direction 460. The vertically directed shear and the right directed yaw result in the fan blades 54 pitching upward. In FIG. 4B, the fan blade 54 also experiences a shear in a lateral direction 470 and a lateral movement that causes the fan blade 54 to pitch downward in a pitch direction 480 (e.g., in the direction opposite of the vertical direction 450 of FIG. 4A). The right directed shear and downward directed pitch result in the fan blades 54 yawing (e.g., twisting or oscillating) to the right. The aforementioned phenomena experienced by the rotating fan blade 54 represent propeller whirl of the fan blade 54. The propeller whirl at the 1P frequency excites backward whirl motion 490 in the fan blade 54.

Stated another way, when the fan blade 54 rotates about the longitudinal centerline axis 12, there is a different angle of attack of the fan blade 54 at the various "clock" positions previously described. That is, the fan blade 54 experiences different amounts of lift. When installed in an aircraft, this may occur when the aircraft is taking off and there is a takeoff rotation (e.g., the 1P frequency) in the aircraft. The change in the angle of attack of the fan blade 54 leads to a moment in the yaw direction (e.g., direction 460) and the pitch direction (e.g., pitch direction 480. The yaw moment feeds into the pitch moment and the pitch moment response feeds into the yaw moment. This leads to propeller whirl, which can lead to a large yaw and pitch moment on the fan rotor system. The fan rotor system is mounted to the aircraft by a plurality of mount links that experience loads due to the rotation of the fan blades 54. Accordingly, the sensor assembly of the present disclosure detects the propeller whirl by measuring the forces acting on the mount links coupling the engine 10 to the aircraft (omitted for clarity).

Figure 2:
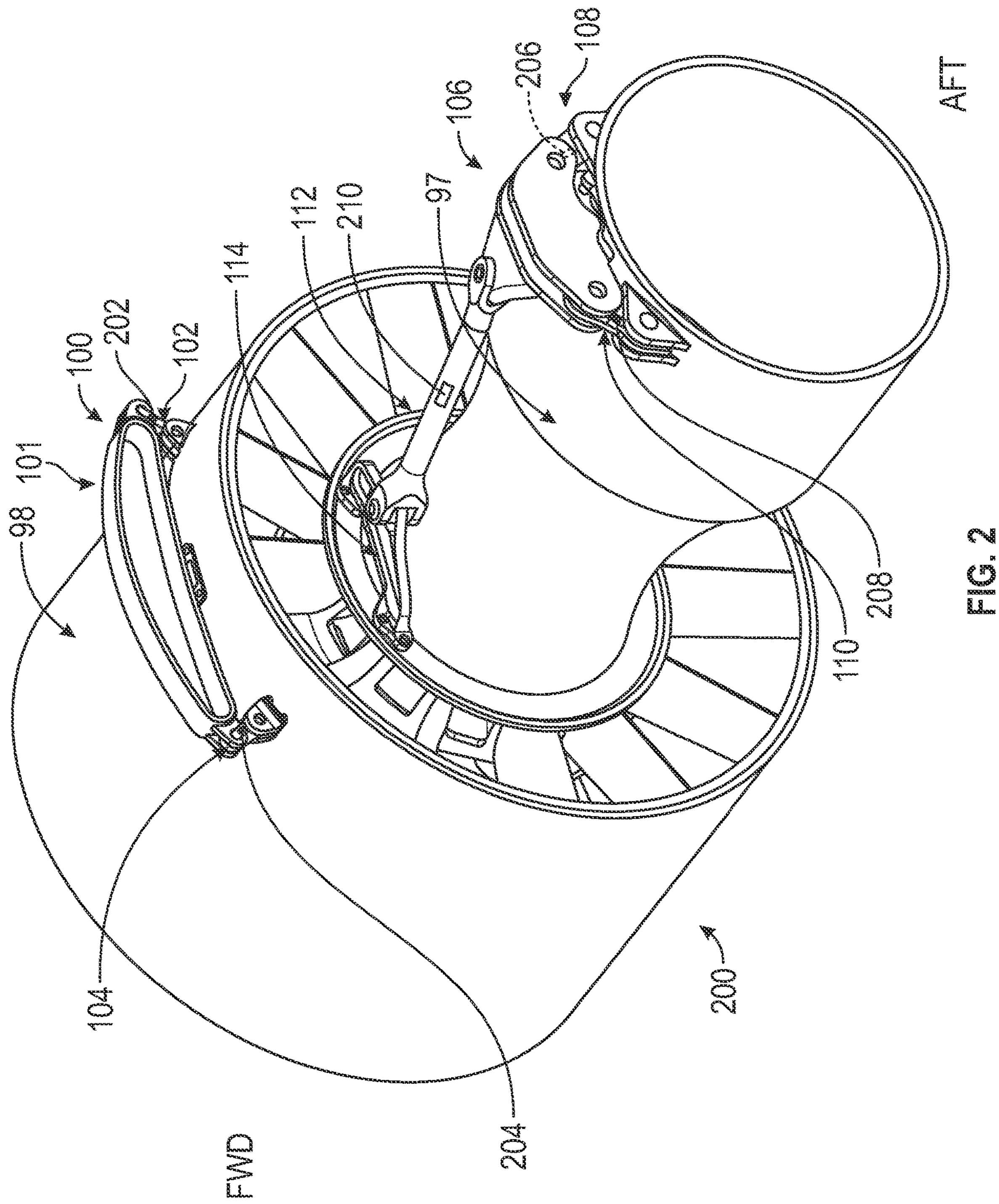
FIG. 2 illustrates a schematic, perspective view of the engine of FIG. 1 with an exemplary sensor assembly according to the present disclosure.

Referring back, FIG. 2 illustrates a perspective view of the engine 10 of FIG. 1. Although omitted for clarity from FIG. 1, the engine includes a turbine rear frame 97 and a fan frame 98. The fan frame 98 houses the fan rotor system. A mounting assembly 100 couples the turbine rear frame 97 and the fan frame 98 to the aircraft (omitted for clarity). The mounting assembly 100 includes a forward mount 101 having a first forward mount link 102 and a second forward mount link 104. The mounting assembly 100 includes an aft mount 106 having a first aft mount link 108 and a second aft mount link 110. The mounting assembly 100 includes a thrust mount link 112. The forward mount 101 couples the fan frame 98 to the aircraft and the aft mount 106 couples the turbine rear frame 97 to the aircraft. The thrust mount link 112 couples the turbine rear frame 97 to the fan frame 98 with a thrust mount 114.

With continued reference to FIG. 2, the engine 10 includes a sensor assembly 200. The sensor assembly 200 includes one or more sensors coupled to the mounting assembly 100. The sensor assembly 200 may include a first forward sensor 202 on the first forward mount link 102. The sensor assembly 200 may include a second forward sensor 204 on the second forward mount link 104. The sensor assembly 200 may include a first aft sensor 206 on the first aft mount link 108. The sensor assembly 200 may include a second aft sensor 208 on the second aft mount link 110. The sensor assembly 200 may include a thrust mount sensor 210 coupled to the thrust mount link 112.

The sensors of the sensor assembly 200 may be strain gauges or other sensors that are configured to detect a loading (e.g., a reaction load) on the mount links of the mounting assembly 100. Each of the strain gauges is oriented along the length or the longitudinal direction of each mount link. The mount links of the mounting assembly 100 take load along the length or the longitudinal direction such that the mount links are in tension or compression. Thus, the strain gauges are oriented in the same direction as that which the mount links take load. Although five sensors are shown and described, more or fewer may be provided.

As noted, the mounting assembly 100 couples the engine 10 to the aircraft. Therefore, since the sensors of the sensor assembly 200 are associated with the mount links of the mounting assembly 100, any load that is generated on the engine 10 will be reacted to in the mounting assembly 100 and will be recorded by the sensor assembly 200. Thus, each sensor indicates the overall reaction of the engine 10 (e.g., by measuring the reaction loads), including any of the pitch and yaw moments discussed with respect to FIG. 4. As will be discussed in more detail with respect to FIGS. 5 and 6, the loads that are not associated with the pitch and yaw moments that are indicative of propeller whirl can be filtered out of the signal transmitted from the sensor assembly 200. Accordingly, the strain gauges of the sensor assembly 200 detect propeller whirl of the fan blades 54.

Figures 3A, 3B, 3C:
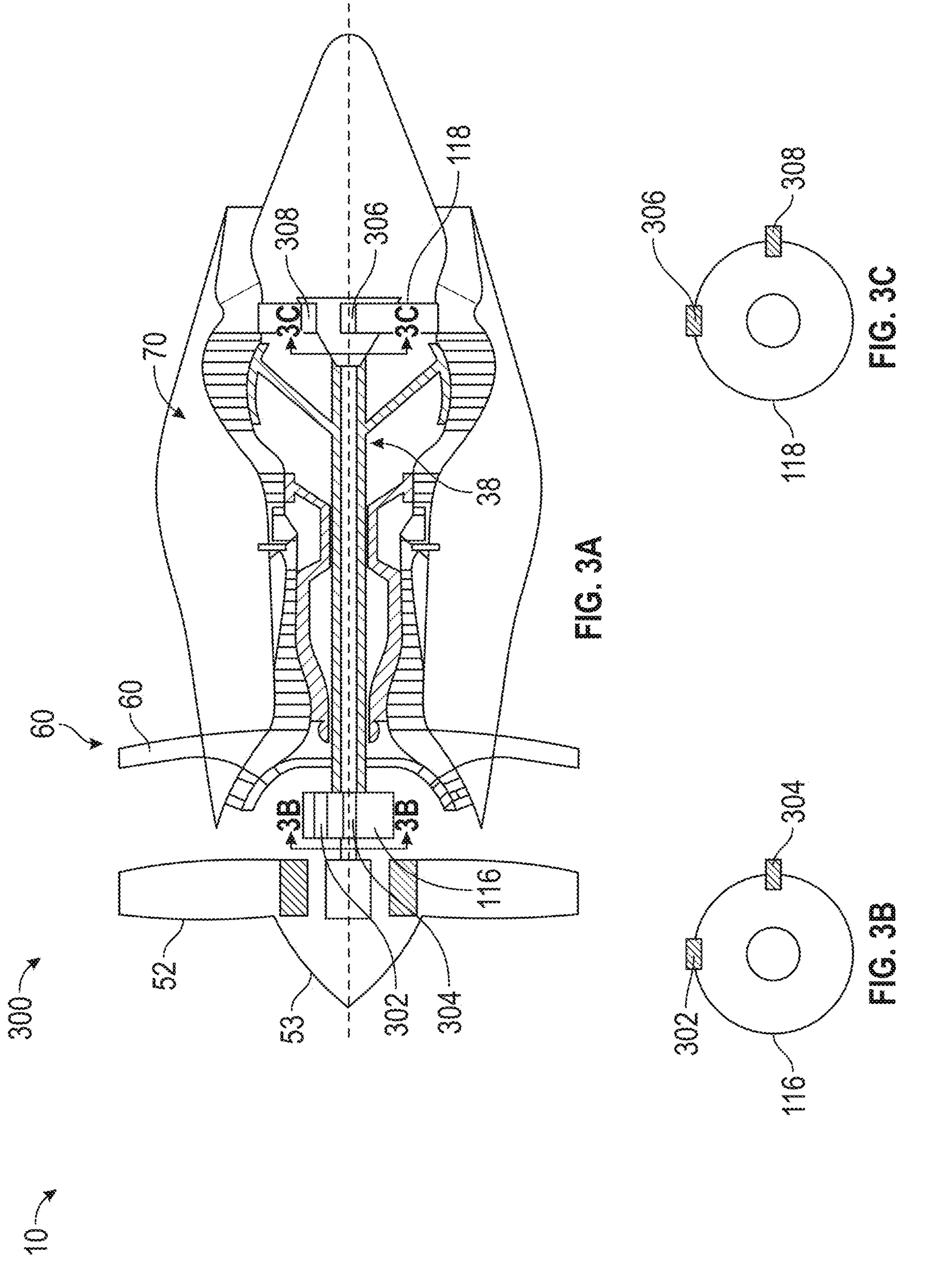
FIG. 3A illustrates a simplified schematic view of the engine of FIG. 1 with another exemplary sensor assembly, according to the present disclosure.
FIG. 3B illustrates a simplified forward looking aft cross-sectional view of the forward bearing assembly, the cross-sectional view taken along line 3B-3B of FIG. 3A, according to the present disclosure.
FIG. 3C illustrates a simplified forward looking aft cross-sectional view of the aft bearing assembly, the cross-sectional view taken along line 3C-3C of FIG. 3A, according to the present disclosure.

FIGS. 3A to 3C illustrate an alternative sensor assembly 300 that may be coupled to the engine 10. The sensor assembly 300 may be employed in lieu of the sensor assembly 200 or in conjunction with the sensor assembly 200. Like reference numerals in FIGS. 3A to 3C represent like parts in FIG. 1. The sensor assembly 300 is coupled to bearing assemblies coupled to the low-pressure shaft 38. The sensor assembly 300 may include a first forward sensor 302 coupled to a forward bearing assembly 116. The sensor assembly 300 may include a second forward sensor 304 coupled to the forward bearing assembly 116. The first forward sensor 302 and the second forward sensor 304 may be mounted to the forward bearing assembly 116 at an orientation that is ninety degrees apart, as shown in the forward to aft looking cross-sectional view of the forward bearing assembly in FIG. 3B, with the first forward sensor 302 coupled at a twelve o'clock position and the second forward sensor 304 coupled at the three o'clock position. This allows the sensor assembly 300 to obtain the load at the forward end of the engine 10 in the vertical direction and the lateral direction.

The sensor assembly 300 may include a first aft sensor 306 coupled to an aft bearing assembly 118. The sensor assembly 300 may include a second aft sensor 308 coupled to the aft bearing assembly 118. The first aft sensor 306 and the second aft sensor 308 may be mounted to the aft bearing assembly 118 at an orientation that is ninety degrees apart, as shown in the forward to aft looking cross-sectional view of the aft bearing assembly in FIG. 3C, with the first aft sensor 306 coupled at a twelve o'clock position and the second aft sensor 308 coupled at the three o'clock position. This allows the sensor assembly 300 to obtain the load at the aft end of the engine 10 in the vertical direction and the lateral direction.

The first forward sensor 302, the second forward sensor 304, the first aft sensor 306, and the second aft sensor 308 may each be located on a stator of the bearing assemblies. Although four sensors are shown and described, more or fewer may be provided. For example, only the two forward sensors (e.g., the first forward sensor 302 and the second forward sensor 304) may be provided.

Although the sensor assembly 200 (FIG. 2) and the sensor assembly 300 (FIG. 3A) are shown and described as including the aforementioned sensors, any combination or sub-combination of the sensors may be present and/or fewer sensors than those shown and described may be present. The sensors of the sensor assembly 200 and the sensor assembly 300 are described herein as strain gauges. Other sensor types, such as load cells and/or accelerometers, may be used in place of or in conjunction with any one or more of the sensors of the sensor assembly 200 and the sensor assembly 300.

Figure 5:
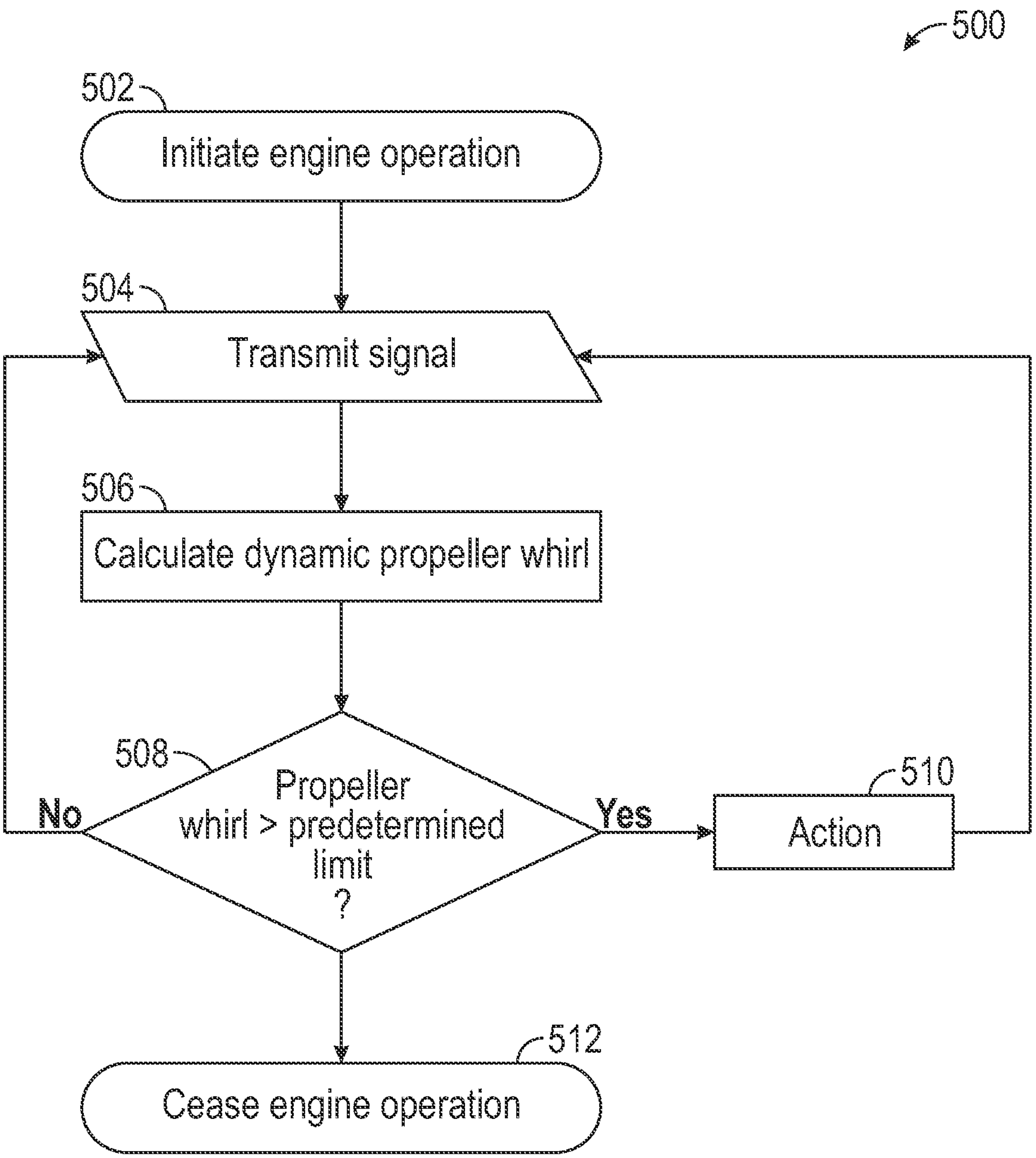
FIG. 5 illustrates a method of detecting whirl of a fan blade, such as the fan blade of the turbine engine shown in FIG. 1, according to the present disclosure.

Referring to FIG. 5, a method 500 may detect a whirl mode of fan blades 54 in the gas turbine engine 10 (FIG. 1)

including the sensor assembly 200 (FIG. 2) or the sensor assembly 300 (FIG. 3A). At step 502, the engine 10, and, thus, the fan blades 54 are placed in operation (e.g., rotation begins), and aerodynamic forces act on each fan blade 54, as described previously. The sensors of the sensor assembly 200 or the sensor assembly 300 detect and transmit data at step 504. At step 506, the measured data is used to calculate the dynamic propeller whirl of the fan blades 54. At step 508, the calculation is compared to a predetermined limit. The predetermined limit may represent a value when propeller whirl is detected. In some examples, the predetermined limit may represent a maximum acceptable value of propeller whirl. If the calculated propeller whirl is greater than the predetermined limit, an action, such as a remedial action or a corrective action, may be taken at step 510. After the action at step 510 is taken and/or if the calculated propeller whirl is less than the predetermined limit, the method 500 is cyclically repeated from steps 504 to step 510 until cessation of the engine 10 occurs at step 512. That is, the method 500 is a closed loop that operates continuously and in real-time during the operation of the engine 10 (FIG. 1). Although described as a predetermined limit, the calculated propeller whirl may be compared to a predetermined range of acceptable values.

The action taken at step 510 may be an active action, a passive action, or a combination thereof. An exemplary active action may include pitch control of the fan blades (e.g., fan blades 54 described with respect to FIG. 3). For example, each fan blade may be controlled independently of each other fan blade with a pitch control system. In another example, each fan blade may be controlled at a particular clock location around the rotational axis. The pitch of the fan blades may be controlled during each revolution of the respective fan blade. The fan blade may be controlled based on the angular position to control the whirl moment and, therefore, reduce the propeller whirl.

Figure 6A:
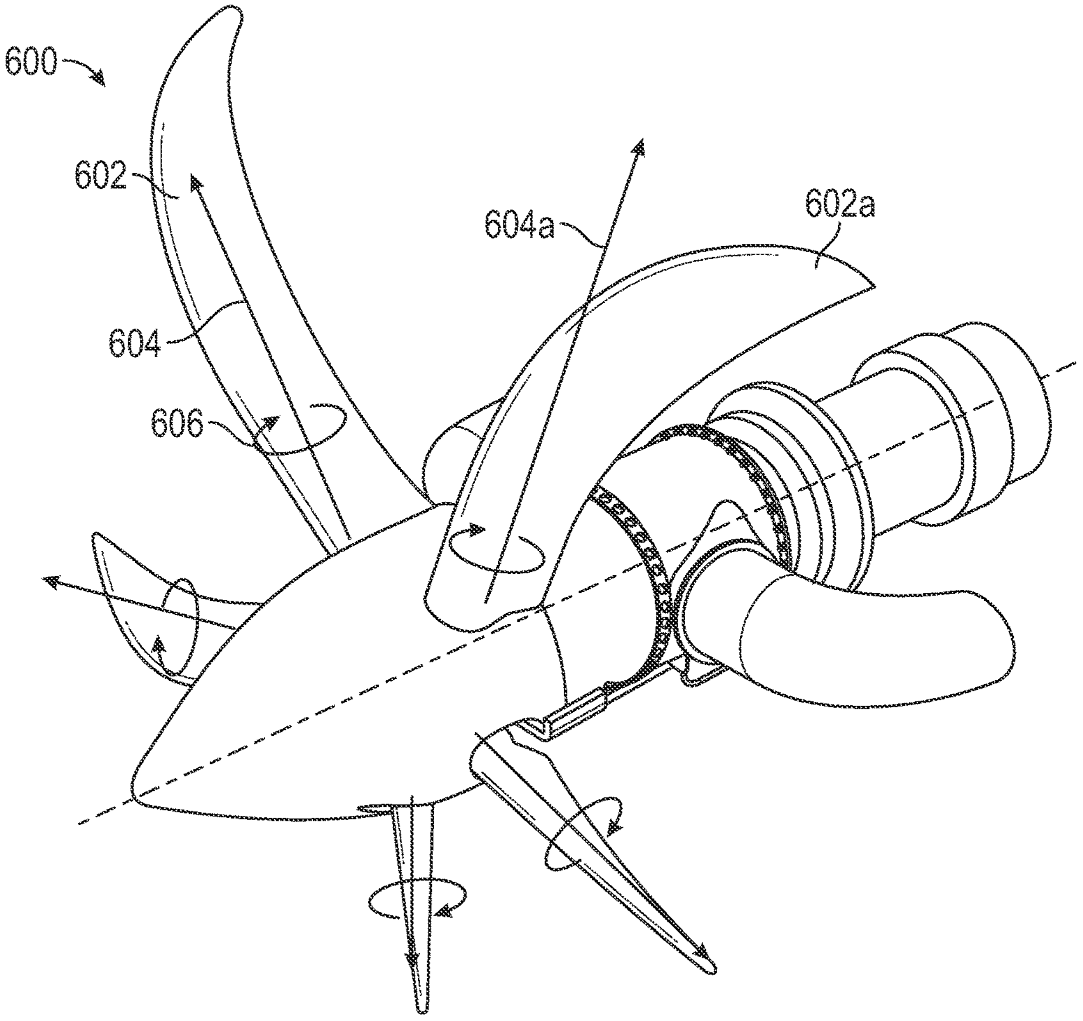
FIG. 6A illustrates a schematic, perspective view of an unducted engine having controllable fan blades, according to the present disclosure.

FIG. 6A illustrates an exemplary engine 600 having a plurality of independently controllable fan blades 602 for employing the active action at step 510 (FIG. 5). Each fan blade 602 has a blade axis 604 about which the fan blade 602 has a pitch angle. Each fan blade 602 is controlled relative to the blade axis 604 to orient the fan blade 602 at a particular pitch angle with respect to the blade axis 604. Each fan blade 602 is controlled by rotating the fan blade 602 about the blade axis 604 in a direction 606. The pitch angle of each fan blade 602 is controllable independently of the remaining fan blades 602. For example, a first fan blade 602*a* is controllable about a first blade axis 604*a* independently of the other fan blades, and, likewise, for the remaining fan blades 602.

The pitch angle of each fan blade 602 affects the forces acting on the fan blades 602 (e.g., as described with respect to FIGS. 4A and 4B). The change in pitch angle affects the yaw angle of the fan blades 602, thus affecting the propeller whirl, as described with respect to FIGS. 4A and 4B and by relationships (1) to (6) described to follow. In an example, each fan blade 602 may be controlled to be out of phase with each other fan blade 602. For example, referring to FIG. 6B, the first fan blade 602*a* and a second fan blade 602*b* are illustrated as a function of the clock position of the blade. That is, for example, referring to FIGS. 4A, 4B, and 6A, each fan blade rotates three hundred-sixty degrees about a longitudinal engine centerline axis. Each position of the fan blade through these three hundred-sixty degrees may correlate to a clock position. For example, zero degrees may correlate to the twelve o'clock position (e.g., 400 in FIG. 4A), one hundred-eighty degrees may correlate to the six o'clock position (e.g., 404 in FIG. 4A). As the fan blade rotates about the engine centerline axis, the pitch angle changes do the relative location of the fan blade with respect to the engine centerline axis.

Figure 6B:
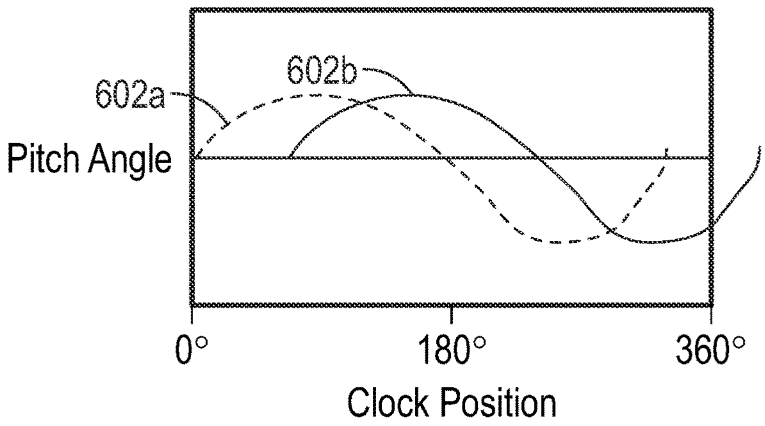
FIG. 6B illustrates a schematic graph showing a phase difference between fan blades of the unducted engine of FIG. 6A, according to the present disclosure.

As noted, when an active action is employed at step 510 (FIG. 5), each fan blade 602 is controlled independently of the remaining fan blades 602. In the example of FIG. 6B, each fan blade 602 is controlled to be out of phase with the remaining fan blades. That is, if the first fan blade 602*a* is a first pitch angle, as the first fan blade 602*a* rotates about the engine centerline axis, the pitch angle will change according to the sinusoidal wave shown in FIG. 6B. The second fan blade 602*b* may be controlled to be at a second pitch angle such that when the second fan blade 602*b* rotates about the engine centerline axis, the sinusoidal wave of the second fan blade 602*b* is misaligned or out of phase with the first fan blade 602*a*. And so forth for the remaining fan blades. In this manner, each of the pitch angles of the fan blades are misaligned to mitigate the forces acting on the blades, thus, mitigating or reducing the propeller whirl. In one example, the fan blades may be out of phase in an even distribution about the three hundred-sixty degrees. For example, in the example of FIG. 6A having five fan blades 602, each fan blade 602 may be out of phase seventy-two degrees with respect to the adjacent fan blade 602.

Figure 7:
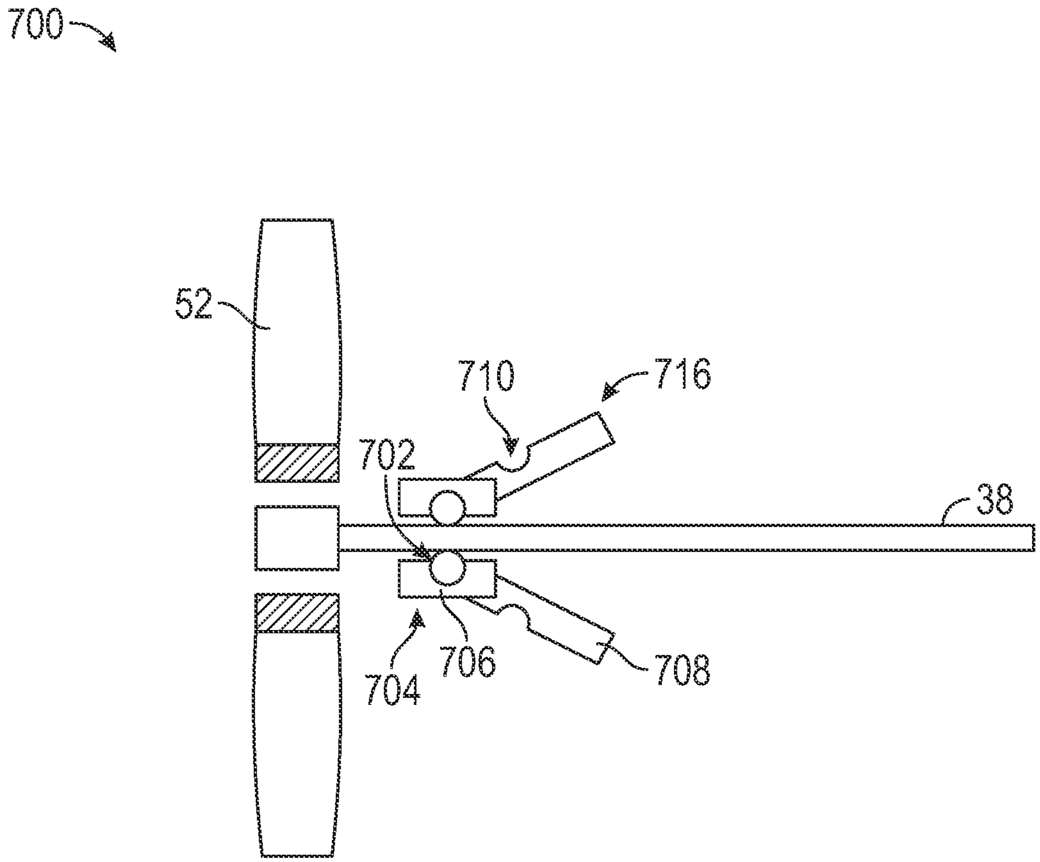
FIG. 7 illustrates a simplified schematic view of the engine of FIG. 1 with a load reduction device, according to the present disclosure.

An exemplary passive action may be a load reduction device. The passive action may be a failsafe. An exemplary load reduction device 700 is illustrated in FIG. 7. For the sake of clarity, only a portion of the engine 10 (FIG. 1) is illustrated in FIG. 7. That is, only the fan 52 and the low-speed shaft 38 are illustrated in FIG. 7, however, all of the features of FIG. 1 and either or both of the sensor systems of FIGS. 2 and 3 may be present in FIG. 7. That is, the load reduction device 700 may be employed in any embodiment described herein.

Referring to FIG. 7, the load reduction device 700 may be included in a bearing assembly 716. The bearing assembly 716 includes a plurality of bearings 702 and a bearing housing 704. The bearing housing 704 has a cylindrical portion 706 and a cone portion 708. The cone portion 708 may include an area 710 having reduced thickness as compared to the remainder of the cone portion 708 such that the area 710 buckles, breaks, or otherwise fails when the loading on the bearing housing 704 exceeds a predetermined value.

During operation, the load reduction device 700 is constructed to buckle or fail at the area 710 when the loading on the bearing housing 704 exceeds a predetermined value. When the predetermined value associated with the propeller whirl is above a predetermined critical limit (e.g., second predetermined limit 804 described with respect to FIG. 8), the load reduction device 700 buckles or fails to protect the components coupled to the fan blades. Once the load reduction device 700 fails, the engine is then shut down.

Referring back to FIG. 5, the step 506 calculation translates the gathered strain/load data from the sensor assembly 200 into an indication of propeller whirl. The step 506 calculation separates the total mount loads sensed into (1) the normal operational loads experienced by the mounting assembly 100 and (2) the mount loads that are related to propeller whirl. The load data gathered by the sensor assembly 200 is represented by relationship 1 below.

$$\{f\}_{total} = \{f\}_{nominal} + \{f\}_{inlet\ aero} + \{f\}_{1P\ load} \quad (1)$$

where $\{f\}_{total}$ represents the total load experienced by the mounting assembly 100, $\{f\}_{nominal}$ represents nominal engine operational load, $\{f\}_{inlet\ aero}$ represents the aerodynamic loading and is based on engine testing conditions, and $\{f\}_{IP\ load}$ represents the load experienced by the mounting assembly 100 that is related to the propeller whirl and 1P loading. Each of the aforementioned loads is related to the geometry of the mounting assembly 100. Each of the aforementioned loads may be expressed as a matrix of factors as shown at (2) to (5) below.

As shown by relationship (2), each of the loads (including those in relationships (3), (4), and (5)), can be represented by three lateral forces, e.g., an axial force, a vertical force, and a side force, and three moments, e.g., roll, pitch, and yaw.

$$\{f\}_{total} = \begin{Bmatrix} \text{F\_axial} \\ \text{F\_vertical} \\ \text{F\_side} \\ \text{M\_roll} \\ \text{M\_pitch} \\ \text{M\_yaw} \end{Bmatrix} \tag{2}$$

As shown by relationship (3), the nominal operating load includes an axial force due to thrust or acceleration of the engine, a vertical force due to gravity, and a pitch moment and a yaw moment due to gyroscopic loads generated when an axis of rotation of the rotor of the engine changes. The loading due to the nominal operating loads are generally more steady state loads, as compared to the 1P loading.

$$\{f\}_{nominal} = \begin{Bmatrix} \text{F\_thrust} \\ F_{1g}\text{down} \\ 0 \\ 0 \\ \text{Gyro\_pitch} \\ \text{Gyro\_yaw} \end{Bmatrix} \tag{3}$$

As shown by relationship (4), the aerodynamic loads include a vertical force due to a vertical shear force, a side force due to a side shear force, a pitch moment, and a yaw moment. The aerodynamic loading is generally more steady state loads, as compared to the 1P loading.

$$\{f\}_{inlet\ aero} = \begin{Bmatrix} 0 \\ \text{F\_vertical shear} \\ \text{F\_side shear} \\ 0 \\ \text{M\_pitch } aero \\ \text{M\_yaw } aero \end{Bmatrix} \tag{4}$$

As shown by relationship (5), the 1P loading includes a vertical force due to a vertical shear force, a side force due to a side shear force, a pitch moment, and a yaw moment. The IP loading is a dynamic load changing during operation of the engine.

$$\{f\}_{1P\ load} = \begin{Bmatrix} 0 \\ \text{F\_vertical shear} \\ \text{F\_side shear} \\ 0 \\ \text{M\_pitch } 1P \\ \text{M\_yaw } 1P \end{Bmatrix} \tag{5}$$

Relying on the above matrices, the pitch moment and the load moment described with respect to FIG. 4 (e.g., the dynamic loading due to the 1P load, e.g., $\{f\}_{IP\ load}$), may be determined by subtracting or removing the nominal loading $\{f\}_{nominal}$ and the aerodynamic loading $\{f\}_{inlet\ aero}$ from the total sensed data $\{f\}_{total}$. Once determined, the dynamic loading $\{f\}_{IP\ load}$ can be compared at step 508 to the predetermined limit to determine if propeller whirl is occurring and/or whether any existing propeller whirl is within a predetermined range or below a predetermined limit. Stated another way, the data obtained from the sensor assembly 200 is equal to the $\{f\}_{total}$ described above. The $\{f\}_{intet\ aero}$ and $\{f\}_{nominal}$ may both be determined from engine testing data. Thus, the $\{f\}_{IP\ load}$, that is indicative of propeller whirl, can be determined from the sensor assembly data by removing or subtracting the engine test data associated with the aforementioned loads, as shown by relationship (6). This is accomplished by passing the strain gauge data from the sensor assembly 200 through a band pass filter to remove the nominal and aerodynamic loads from the total strain gauge data.

$$\{f\}_{1P\ load} = \{f\}_{total} - \{f\}_{nominal} - \{f\}_{inlet\ aero} \tag{6}$$

Although the aforementioned description of step 506 is described in relation to sensor assembly 200, a similar or the same process may be employed for the sensor assembly 300.

Figure 8:
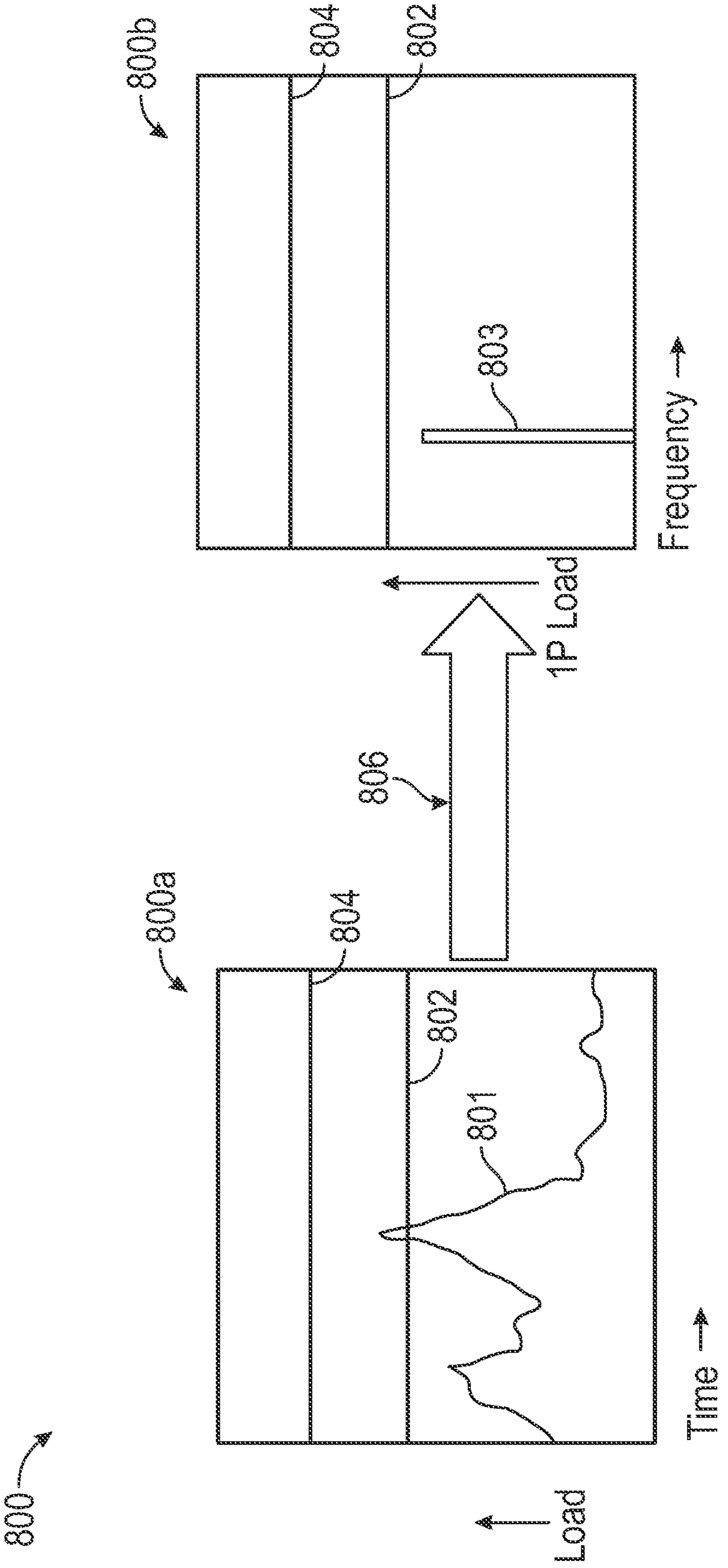
FIG. 8 illustrates an exemplary display for a system for detecting whirl of a fan blade, according to the present disclosure.

FIG. 8 illustrates an exemplary display 800 of data that may be obtained from the sensor assembly 200 (FIG. 2) or the sensor assembly 300 (FIG. 3A) and the method 500 (FIG. 5). The display 800*a* illustrates a graph of the load detected by the sensor assembly 200 or the sensor assembly 300 versus the time or duration of detection. As shown, data 801 from the sensor assembly 200 or the sensor assembly 300 is plotted as a function of time or duration of detection.

The data 801 may be below a first predetermined limit 802, which may indicate an acceptable or a "green" load on the mounting assembly 100 (or on the bearing assemblies for the sensor assembly 300). In instances when the data 801 is below the first predetermined limit 802, no action (e.g., step 510) is taken and monitoring continues (e.g., steps 504, 506, 508).

The data 801 may, at times, extend past the first predetermined limit 802 such that the data 801 may be located above the first predetermined limit 802, but below a second predetermined limit 804. This may represent a cautionary or a "yellow" load on the mounting assembly 100 (or on the bearing assemblies for the sensor assembly 300). The second predetermined limit 804 is an unacceptable load value on the fan blades that may lead to a failure within the engine. When the data 801 is within this yellow section (e.g., between the first predetermined limit 802 and the second predetermined limit 804), this is viewed as an alert zone or cautionary zone. Monitoring is continued within the yellow section. The active action (e.g., control of the blades) may occur in the yellow section.

In some instances, the data 801 may be located above a second predetermined limit 804, also referred to as the critical limit 804, which may represent a critical or a "red" load on the mounting assembly (or on the bearing assemblies for the sensor assembly 300). When the critical limit 804 is reached, the passive action (e.g., the load reduction device) may actuate to reduce the moment on the fan blades and reduce the propeller whirl.

Each of the first predetermined limit 802 and the second predetermined limit 804 may be set or predetermined based on the particular engine, particular expected operating conditions, particular aircraft, architecture of the engine, engine size, fan size, etc., or combinations thereof. The display 800*b* illustrates the data 801 processed with a band pass filter 806. Once processed, the data 801 becomes data 803 and is graphed as 1P load (e.g., load at the base RPM of the fan blade 54) versus frequency. The display 800*b* represents whether the propeller whirl is present in the fan blades 54.

The green or acceptable range (e.g., below the first predetermined limit 802) may represent a load that is acceptable for operation and no remedial action is required. The yellow or cautionary range (e.g., between the first predetermined limit 802 and the second predetermined limit 804) may represent a condition where the operator monitors or otherwise watches to ensure the second predetermined limit 804 is not surpassed. A remedial action may or may not be taken in the yellow range. In the red or critical range (e.g., above the second predetermined limit 804), a remedial action may be then taken to reduce the load below the second predetermined limit 804 and/or to halt or cease operation of the engine 10.

Accordingly, the present disclosure describes a system for and a method of detecting whirl in fan blades of an engine. The sensor assemblies and related method of the present disclosure provide an engine monitoring system. The sensor assemblies and related method of the present disclosure allow for detecting propeller whirl for open fan engines and detecting associated 1P loads within defined limits with respect to a flight mission. The present disclosure allows for strain measurements at mount links or bearing assemblies to be translated into a detection of propeller whirl. The present disclosure is based on a combination of mount link load measurements using strain gauges and its correlation to 1P Dynamic load using a free body diagram and/or a development engine pull load test correlation. The present disclosure also provides the low-pressure shaft bearings to be instrumented with strain gauges and/or accelerometer directly to measure the dynamic content from 1P load.

Further aspects of the present disclosure are provided by the subject matter of the following clauses.

A gas turbine engine having a sensor assembly for monitoring propeller whirl, the gas turbine engine includes a frame housing the gas turbine engine, a plurality of fan blades configured to rotate about a longitudinal centerline axis of the gas turbine engine, a mounting assembly coupling the frame to a structure, and a sensor assembly coupled to the mounting assembly and having at least one sensor configured to detect a load on the mounting assembly, the sensor assembly being configured to monitor propeller whirl in the plurality of fan blades by detecting the load on the mounting assembly, and a feature configured to take a corrective action when propeller whirl is detected above a predetermined limit.

The engine gas turbine of the preceding clause, the at least one sensor being a strain gauge.

The gas turbine engine of any preceding clause, the at least one sensor being a load cell.

The gas turbine engine of any preceding clause, the mounting assembly comprising a forward mount, a thrust mount link, and an aft mount, and the at least one sensor comprises both a first forward sensor and a second forward sensor on the forward mount, both a first aft sensor and a second aft sensor on the aft mount, and a thrust sensor on the thrust mount link.

The gas turbine engine of any preceding clause, the mounting assembly comprising a forward mount, the at least one sensor coupled to the forward mount.

The gas turbine engine of any preceding clause, the mounting assembly comprising a forward mount, the at least one sensor comprising a first forward sensor and a second forward sensor both coupled to the forward mount.

The gas turbine engine of any preceding clause, the mounting assembly comprising a thrust mount link, the at least one sensor coupled to the thrust mount link.

The gas turbine engine of any preceding clause, the mounting assembly comprising a thrust mount link, the at least one sensor comprising a thrust sensor coupled to the thrust mount link.

The gas turbine engine of any preceding clause, the mounting assembly comprising an aft mount, the at least one sensor coupled to the aft mount.

The gas turbine engine of any preceding clause, the mounting assembly comprising an aft mount, the at least one sensor comprising a first aft sensor and a second aft sensor both coupled to the aft mount.

The gas turbine engine of any preceding clause, wherein the feature is a load reduction device configured to fail when the propeller whirl is detected above the predetermined limit.

The gas turbine engine of any preceding clause, wherein the feature is a device to control pitch of each of the plurality of fan blades when the propeller whirl is detected above the predetermined limit.

The gas turbine engine of any preceding clause, the frame comprising a fan frame and the mounting assembly comprises a forward mount coupling the fan frame to the structure, and the at least one sensor being located on the forward mount.

The gas turbine engine of any preceding clause, the forward mount comprising a first forward mount link and a second forward mount link and the at least one sensor comprising a first forward sensor located on the first forward mount link and a second forward sensor located on the second forward mount link.

The gas turbine engine of any preceding clause, the frame comprising a turbine rear frame and the mounting assembly comprises an aft mount coupling the turbine rear frame to the structure, and the at least one sensor including a sensor located on the aft mount.

The gas turbine engine of any preceding clause, the aft mount comprising a first aft mount link and a second aft mount link and the at least one sensor comprising a first aft sensor located on the first aft mount link and a second aft sensor located on the second aft mount link.

The gas turbine engine of any preceding clause, further comprising a thrust mount link coupled to the aft mount, the at least one sensor comprising a thrust mount sensor located on the thrust mount link.

The gas turbine engine of any preceding clause, the frame comprising a fan frame and a turbine rear frame, and the at least one sensor comprising a forward sensor located on a forward mount of the mounting assembly and an aft sensor located on an aft mount of the mounting assembly.

The gas turbine engine of any preceding clause, the forward sensor comprising a first forward sensor on a first forward mount link coupling the forward mount to the fan frame and a second forward sensor on a second forward mount link coupling the forward mount to the fan frame.

The gas turbine engine of any preceding clause, the aft sensor comprising a first aft sensor on a first aft mount link coupling the aft mount to the turbine rear frame and a second aft sensor on a second aft mount link coupling the aft mount to the turbine rear frame.

The gas turbine engine of any preceding clause, further comprising a thrust sensor on a thrust mount coupled to the turbine rear frame.

An aircraft comprising the gas turbine engine of any preceding clause.

An aircraft comprises an unducted engine comprising a longitudinal centerline axis and a plurality of fan blades configured to rotate about the longitudinal centerline axis, a mounting assembly coupling the unducted engine to the aircraft, and a sensor assembly coupled to the mounting assembly and configured to detect a load on the mounting assembly, the sensor assembly being configured to monitor propeller whirl in the plurality of fan blades by detecting the load on the mounting assembly, and a feature configured to take a corrective action when propeller whirl is detected outside of a predetermined limit.

The aircraft of any preceding clause, at least one sensor of the sensor assembly being a strain gauge or a load cell.

The aircraft of any preceding clause, the mounting assembly comprising a forward mount, a thrust mount link, and an aft mount, and the sensor assembly comprises both a first forward sensor and a second forward sensor on the forward mount, both a first aft sensor and a second aft sensor on the aft mount, and a thrust sensor on the thrust mount link.

The aircraft of any preceding clause, wherein the feature is a load reduction device, a device configured to control a pitch of the plurality of fan blades, or both the load reduction device and the device configured to control the pitch of the plurality of fan blades.

The aircraft of any preceding clause, further comprising a frame between the unducted engine and the aircraft.

The aircraft of any preceding clause, the frame comprising a fan frame and a turbine rear frame, and the sensor assembly comprising a forward sensor located on a forward mount of the mounting assembly and an aft sensor located on an aft mount of the mounting assembly.

The aircraft of any preceding clause, the forward sensor comprising a first forward sensor on a first forward mount link coupling the forward mount to the fan frame and a second forward sensor on a second forward mount link coupling the forward mount to the fan frame.

The aircraft of any preceding clause, the aft sensor comprising a first aft sensor on a first aft mount link coupling the aft mount to the turbine rear frame and a second aft sensor on a second aft mount link coupling the aft mount to the turbine rear frame.

The aircraft of any preceding clause, further comprising a thrust sensor on a thrust mount coupled to the turbine rear frame.

The aircraft of any preceding clause, the frame comprising a fan frame and the mounting assembly comprises a forward mount configured to couple the fan frame to the structure, and the at least one sensor being located on the forward mount.

The aircraft of any preceding clause, the forward mount comprising a first forward mount link and a second forward mount link and the at least one sensor comprising a first forward sensor located on the first forward mount link and a second forward sensor located on a second forward mount link.

The aircraft of any preceding clause, the frame comprising a turbine rear frame and the mounting assembly comprises an aft mount configured to couple the turbine rear frame to the structure, and the at least one sensor including a sensor located on the aft mount.

The aircraft of any preceding clause, the aft mount comprising a first aft mount link and a second aft mount link and the at least one sensor comprising a first aft sensor located on the first aft mount link and a second aft sensor located on a second aft mount link.

The aircraft of any preceding clause, further comprising a thrust mount link coupled to the aft mount, the at least one sensor comprising a thrust mount sensor located on the thrust mount link.

The aircraft of any preceding clause, further comprising a load reduction device configured to fail when the propeller whirl is detected above the predetermined limit.

The aircraft of any preceding clause, further comprising a device to control pitch of each of the plurality of fan blades when the propeller whirl is detected above the predetermined limit.

A sensor assembly for detecting propeller whirl in a fan blade, the sensor assembly comprising a first forward sensor, a second forward sensor, a thrust sensor, a first aft sensor, and a second aft sensor, each sensor being a strain gauge or a load cell.

A gas turbine engine with the sensor assembly of any preceding clause.

A method of detecting propeller whirl with the sensor assembly of the preceding clause.

A method of detecting propeller whirl of a fan blade of the gas turbine engine of any preceding clause.

A method of detecting propeller whirl of a fan blade of the aircraft of any preceding clause.

A method of detecting propeller whirl of a fan blade of an engine, the method including operating the engine, rotating the fan blade in a circumferential direction during operation of the engine, detecting, with a sensor, a load on a mounting assembly configured to hold the engine to a structure, filtering the detected load to remove nominal and aerodynamic loads to generate a 1P load, comparing the 1P load to a predetermined limit, and detecting propeller whirl of the fan blade based on the comparing.

The method of the preceding clause, further comprising taking remedial action when propeller whirl is detected.

The method of any preceding clause, filtering the detected load further including filtering with a band pass filter.

The method of any preceding clause, the sensor being a strain gauge.

The method of any preceding clause, the engine being an unducted engine.

The method of any preceding clause, further comprising taking action when the 1P loading is above the predetermined limit.

The method of any preceding clause, wherein the action is a passive action, the passive action including failure of a load reduction device when the propeller whirl is above the predetermined limit.

The method of any preceding clause, wherein the action is an active action, the active action including controlling pitch of each of the plurality of fan blades when the propeller whirl is above the predetermined limit.

The method of any preceding clause, wherein the detected load is a total load experienced by the mounting assembly, the total load equal to the sum of a nominal engine operational load, an aerodynamic load, and the 1P load.

The method of any preceding clause, wherein filtering the detected load comprises subtracting each of the nominal engine operational load and the aerodynamic loading from the total load to result in the 1P load.

The method of any preceding clause, wherein each of the total load, the nominal engine operational load, the aerodynamic load, and the 1P load comprises an axial force, a vertical force, a side force, a roll moment, a pitch moment, and a yaw moment.

The method of any preceding clause, wherein the nominal engine load comprises an axial force due to thrust, a vertical force due to gravity, a pitch moment and a yaw moment due to rotational motion.

The method of the preceding clause, wherein a side force and a roll moment in the nominal engine load are each zero.

The method of any preceding clause, wherein the aerodynamic load comprises a vertical force and a side force each due to shear, a pitch moment and a yaw moment due to aerodynamics.

The method of the preceding clause, wherein an axial force and a roll moment in the aerodynamic load are each zero.

The method of any preceding clause, wherein the 1P load comprises a vertical force and a side force each due to shear, a pitch moment and a yaw moment due to 1P dynamic loading.

The method of the preceding clause, wherein an axial force and a roll moment in the aerodynamic load are each zero.

The method of any preceding clause, wherein the aerodynamic load and the nominal load are determined from engine testing data.

An engine including a plurality of fan blades configured to rotate about a longitudinal centerline axis of the engine, a shaft configured to rotate the plurality of fan blades, a forward bearing assembly supporting a forward end of the shaft, an aft bearing assembly supporting an aft end of the shaft, and a sensor assembly coupled to the forward bearing assembly and configured to detect a load on the forward bearing assembly, the sensor assembly being configured to monitor propeller whirl in the plurality of fan blades by detecting the load on the forward bearing assembly, and a feature configured to take a corrective action when propeller whirl is detected above a predetermined limit.

The engine of the preceding clause, the sensor assembly being coupled to the aft bearing assembly and configured to detect a load on the aft bearing assembly.

The engine of any preceding clause, the sensor assembly comprising a first forward sensor and a second forward sensor, each coupled to the forward bearing assembly.

The engine of any preceding clause, the first forward sensor being coupled to the forward bearing assembly at a twelve o'clock position and the second forward sensor is coupled to the forward bearing assembly at a three o'clock position.

The engine of any preceding clause, the sensor assembly comprising a first aft sensor and a second aft sensor, each coupled to the aft bearing assembly.

The engine of any preceding clause, the first aft sensor being coupled to the aft bearing assembly at a twelve o'clock position and the second aft sensor is coupled to the aft bearing assembly at a three o'clock position.

The engine of any preceding clause, the sensor assembly including one or more strain gauges or accelerometers.

The engine of any preceding clause, the shaft being a low-pressure turbine shaft.

The engine of any preceding clause, further comprising a load reduction device configured to fail when the propeller whirl is detected above the predetermined limit.

The engine of any preceding clause, further comprising a device to control pitch of each of the plurality of fan blades when the propeller whirl is detected above the predetermined limit.

The engine of any preceding clause, wherein the feature is a load reduction device configured to fail when the propeller whirl is detected above the predetermined limit.

The engine of any preceding clause, wherein the feature is a device to control pitch of each of the plurality of fan blades when the propeller whirl is detected above the predetermined limit.

An aircraft including an unducted engine comprising a longitudinal centerline axis and a plurality of fan blades configured to rotate about the longitudinal centerline axis, a shaft configured to rotate the plurality of fan blades, a forward bearing assembly supporting a forward end of the shaft, an aft bearing assembly supporting an aft end of the shaft, and a sensor assembly coupled to the forward bearing assembly and configured to detect a load on the forward bearing assembly, the sensor assembly being configured to monitor propeller whirl in the plurality of fan blades by detecting the load on the forward bearing assembly, and a feature configured to take a corrective action when propeller whirl is detected outside of a predetermined limit.

The aircraft of the preceding clause, the sensor assembly being coupled to the aft bearing assembly and configured to detect a load on the aft bearing assembly.

The aircraft of any preceding clause, the sensor assembly comprising a first forward sensor and a second forward sensor, each coupled to the forward bearing assembly.

The aircraft of any preceding clause, the first forward sensor being coupled to the forward bearing assembly at a twelve o'clock position and the second forward sensor is coupled to the forward bearing assembly at a three o'clock position.

The aircraft of any preceding clause, the sensor assembly comprising a first aft sensor and a second aft sensor, each coupled to the aft bearing assembly.

The aircraft of any preceding clause, the first aft sensor being coupled to the aft bearing assembly at a twelve o'clock position and the second aft sensor is coupled to the aft bearing assembly at a three o'clock position.

The aircraft of any preceding clause, the sensor assembly including one or more strain gauges or accelerometers.

The aircraft of any preceding clause, the shaft being a low-pressure turbine shaft.

The aircraft of any preceding clause, further comprising a load reduction device configured to fail when the propeller whirl is detected above the predetermined limit.

The aircraft of any preceding clause, further comprising a device to control pitch of each of the plurality of fan blades when the propeller whirl is detected above the predetermined limit.

A sensor assembly for detecting propeller whirl in a fan blade, the sensor assembly comprising a first forward sensor, a second forward sensor, a first aft sensor, and a second aft sensor, each sensor being a strain gauge or an accelerometer.

A gas turbine engine with the sensor assembly of any preceding clause.

A method of detecting propeller whirl with the sensor assembly of the preceding clause.

A method of detecting propeller whirl of a fan blade of the gas turbine engine of any preceding clause.

A method of detecting propeller whirl of a fan blade of the aircraft of any preceding clause.

A method of detecting propeller whirl of a fan blade of an engine, the method including operating the engine, rotating a shaft to rotate the fan blade in a circumferential direction during operation of the engine, detecting, with a sensor, a load on a bearing assembly supporting the shaft, filtering the detected load to remove nominal and aerodynamic loads to generate a 1P loading, comparing the 1P loading to a predetermined limit, and detecting propeller whirl of the fan blade based on the comparing.

The method of the preceding clause, further comprising taking remedial action when propeller whirl is detected.

The method of any preceding clause, filtering the detected load further including filtering with a band pass filter.

The method of any preceding clause, the sensor being a strain gauge or an accelerometer.

The method of any preceding clause, the shaft being a low-pressure turbine shaft.

The method of any preceding clause, the engine being an unducted engine. The method of any preceding clause, further comprising taking action when the 1P loading is above the predetermined limit.

The method of any preceding clause, wherein the action is a passive action, the passive action including failure of a load reduction device when the propeller whirl is above the predetermined limit.

The method of any preceding clause, wherein the action is an active action, the active action including controlling pitch of each of the plurality of fan blades when the propeller whirl is above the predetermined limit.

The method of any preceding clause, wherein the detected load is a total load experienced by the mounting assembly, the total load equal to the sum of a nominal engine operational load, an aerodynamic load, and the 1P load.

The method of any preceding clause, wherein filtering the detected load comprises subtracting each of the nominal engine operational load and the aerodynamic loading from the total load to result in the 1P load.

The method of any preceding clause, wherein each of the total load, the nominal engine operational load, the aerodynamic load, and the 1P load comprises an axial force, a vertical force, a side force, a roll moment, a pitch moment, and a yaw moment.

The method of any preceding clause, wherein the nominal engine load comprises an axial force due to thrust, a vertical force due to gravity, a pitch moment and a yaw moment due to rotational motion.

The method of the preceding clause, wherein a side force and a roll moment in the nominal engine load are each zero.

The method of any preceding clause, wherein the aerodynamic load comprises a vertical force and a side force each due to shear, a pitch moment and a yaw moment due to aerodynamics.

The method of the preceding clause, wherein an axial force and a roll moment in the aerodynamic load are each zero.

The method of any preceding clause, wherein the 1P load comprises a vertical force and a side force each due to shear, a pitch moment and a yaw moment due to 1P dynamic loading.

The method of the preceding clause, wherein an axial force and a roll moment in the aerodynamic load are each zero.

The method of any preceding clause, wherein the aerodynamic load and the nominal load are determined from engine testing data.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gas turbine engine having a sensor assembly for monitoring propeller whirl, the gas turbine engine comprising:

a frame housing the gas turbine engine;

a plurality of fan blades configured to rotate about a longitudinal centerline axis of the gas turbine engine;

a mounting assembly coupled to the frame;

an engine monitoring system to monitor the propeller whirl of the plurality of fan blades, the engine monitoring system comprising:

the sensor assembly coupled to the mounting assembly, the sensor assembly including at least one sensor configured to detect a load on the mounting assembly; and an engine control system configured to receive the load from the sensor assembly and to calculate a dynamic load indicative of the plurality of fan blades experiencing the propeller whirl; and a pitch control system communicatively connected to the engine control system, the pitch control system controlling pitch of each of the plurality of fan blades when the dynamic load is determined to be above a predetermined limit.

2. The gas turbine engine of claim 1, wherein the at least one sensor is a strain gauge or a load cell.

3. The gas turbine engine of claim 1, wherein the mounting assembly comprises a forward mount, a thrust mount link, and an aft mount, and the at least one sensor comprises both a first forward sensor and a second forward sensor on the forward mount, both a first aft sensor and a second aft sensor on the aft mount, and a thrust sensor on the thrust mount link.

4. The gas turbine engine of claim 1, wherein the plurality of fan blades are connected to a load reduction device configured to fail when the dynamic load is detected above a predetermined critical limit.

5. The gas turbine engine of claim 1, wherein the frame comprises a fan frame and the mounting assembly comprises a forward mount coupled to the fan frame, and wherein the at least one sensor is located on the forward mount.

6. The gas turbine engine of claim 5, the forward mount comprising a first forward mount link and a second forward mount link and the at least one sensor comprising a first forward sensor located on the first forward mount link and a second forward sensor located on the second forward mount link.

7. The gas turbine engine of claim 1, wherein the frame comprises a turbine rear frame and the mounting assembly comprises an aft mount coupled to the turbine rear frame, and wherein the at least one sensor includes a sensor located on the aft mount.

8. The gas turbine engine of claim 7, the aft mount comprising a first aft mount link and a second aft mount link and the at least one sensor comprising a first aft sensor located on the first aft mount link and a second aft sensor located on the second aft mount link.

9. The gas turbine engine of claim 7, further comprising a thrust mount link coupled to the aft mount, the at least one sensor comprising a thrust mount sensor located on the thrust mount link.

10. The gas turbine engine of claim 1, wherein the frame comprises a fan frame and a turbine rear frame, and wherein the at least one sensor comprises a forward sensor located on a forward mount of the mounting assembly and an aft sensor located on an aft mount of the mounting assembly.

11. The gas turbine engine of claim 10, wherein the forward sensor comprises a first forward sensor on a first forward mount link coupling the forward mount to the fan frame and a second forward sensor on a second forward mount link coupling the forward mount to the fan frame.

12. The gas turbine engine of claim 10, wherein the aft sensor comprises a first aft sensor on a first aft mount link coupling the aft mount to the turbine rear frame and a second aft sensor on a second aft mount link coupling the aft mount to the turbine rear frame.

13. The gas turbine engine of claim 10, further comprising a thrust sensor on a thrust mount coupled to the turbine rear frame.

14. An aircraft comprising:

a gas turbine engine comprising a longitudinal centerline axis and a plurality of fan blades configured to rotate about the longitudinal centerline axis;

a mounting assembly coupling the gas turbine engine to the aircraft;

an engine monitoring system to monitor propeller whirl of the plurality of fan blades, the engine monitoring system comprising:

a sensor assembly coupled to the mounting assembly, the sensor assembly including at least one sensor configured to detect a load on the mounting assembly; and an engine control system configured to receive the load from the sensor assembly and to calculate a dynamic load indicative of the plurality of fan blades experiencing the propeller whirl; and a pitch control system communicatively connected to the engine control system, the pitch control system controlling pitch of each of the plurality of fan blades when the dynamic load is determined to be above a predetermined limit.

15. The aircraft of claim 14, wherein the plurality of fan blades are connected to a load reduction device configured to fail when the dynamic load is detected above a predetermined critical limit.

16. The aircraft of claim 15, wherein the sensor assembly comprises a forward sensor located on a forward mount of the mounting assembly and an aft sensor located on an aft mount of the mounting assembly.

17. The aircraft of claim 16, wherein the forward sensor comprises a first forward sensor on a first forward mount link coupling the forward mount to a fan frame and a second forward sensor on a second forward mount link coupling the forward mount to the fan frame.

18. The aircraft of claim 16, wherein the aft sensor comprises a first aft sensor on a first aft mount link coupling the aft mount to a turbine rear frame and a second aft sensor on a second aft mount link coupling the aft mount to the turbine rear frame.

19. The aircraft of claim 16, further comprising a thrust sensor on a thrust mount coupled to a turbine rear frame.

20. The aircraft of claim 14, wherein the gas turbine engine is one of a ducted engine or an unducted engine.

* * * * *